United States Patent

Patel

[11] Patent Number: 5,552,501
[45] Date of Patent: Sep. 3, 1996

[54] METHOD FOR THE RAPID FREE RADICAL POLYMERIZATION OF ACRYLAMIDE CO-POLYMERS USING TETRAMETHYLAMINE CATALYSTS

[76] Inventor: Kamala D. Patel, 12831 N. Stratford Dr. #104, Oklahoma City, Okla. 73120

[21] Appl. No.: 489,947

[22] Filed: Jun. 13, 1995

Related U.S. Application Data

[63] Continuation-in-part of Ser. No. 236,953, May 2, 1994, abandoned.

[51] Int. Cl.$^6$ .................................................. C08F 2/00
[52] U.S. Cl. ...................... 526/217; 526/219; 526/219.1; 526/304
[58] Field of Search .................................. 526/217, 219, 526/219.1

[56] References Cited

U.S. PATENT DOCUMENTS

| | | |
|---|---|---|
| 3,551,391 | 12/1970 | Crocker et al. . |
| 3,919,140 | 11/1975 | Hirata et al. ............................. 526/217 |
| 3,931,122 | 1/1976 | Isaoka et al. ............................ 526/217 |

FOREIGN PATENT DOCUMENTS

| | | | |
|---|---|---|---|
| 49-26074 | 7/1974 | Japan ..................... 526/245 |

Primary Examiner—Joseph L. Schofer
Assistant Examiner—N. Sarofim
Attorney, Agent, or Firm—Thorpe North & Western

[57] ABSTRACT

A method for the accelerated free radical copolymerization of acrylamide monomers and diacetone acrylamide monomers in an aqueous solution to form copolymers which may be combined with photosensitizers and utilized in the color picture tube or photoengraving industries as a polymeric component of the light sensitive photoresists comprises admixing an aqueous acrylamide and diacetone acrylamide monomer solution with an effective amount of a free radical initiator and an effective amount of a tetramethylamine catalyst to form a mixture and maintaining the mixture at ambient temperature until the polymerization is complete. A 0.1 to 15% weight solution of the two monomers having an acrylamide to diacetone acrylamide weight ratio of between about 0.4:1 to 100:1 is completely polymerized in less than an hour when the weight ratio of free radical initiator to monomers is between about 1:6 to 1:300 and the weight ratio of tetramethylamine catalyst to monomers is about 1:20 and 1:400. The preferred tetramethylamine catalyst is N,N,N',N'-tetramethylethylenediamine (TEMED) and the preferred free radical initiator is ammonium persulfate.

18 Claims, No Drawings

1

METHOD FOR THE RAPID FREE RADICAL POLYMERIZATION OF ACRYLAMIDE CO-POLYMERS USING TETRAMETHYLAMINE CATALYSTS

This application is a continuation-in-part of application Ser. No. 08/236,953 filed May 2, 1994 abandoned.

BACKGROUND OF THE INVENTION

The present invention relates to the rapid polymerization of acrylamide copolymers. More particularly, this invention relates to the use of the rapid polymerization of water soluble acrylamide copolymers useful as photoresist compositions through the use of tetramethylamine catalytic agents in the presence of free radical initiators.

Polyacrylamide (PAM) mixed with other polymers and a copolymer of acrylamide and diacetone acrylamide (PAD) can be used in the color picture tube or photoengraving industries as a polymeric component of the light sensitive photoresist. Prior to crosslinking, the photoresist polymers are water soluble. Reciprocity-failing photoresist formulations generally consist of water soluble polymers or copolymers and photosensitizer crosslinking reagents. Such formulations may also contain a coupling agent for substrate adhesion, and a surfactant. The film is coated onto a substrate and is exposed to ultraviolet light through a mask pattern resulting in crosslinking of the polymeric components. The unexposed area is subsequently removed from the substrate with water and the pattern is formed.

Although other polymers such as polyvinylpyrrolidone (PVP) and polyvinylalcohol (PVA) have been used for this process, the acrylamide polymers and/or co-polymers are superior due to their ability to achieve higher print down and their ability to print a fine pitch high definition product with excellent edge or pattern definition.

The current state-of-the-art polymerization process for the copolymer of acrylamide and diacetone acrylamide has been described by Kohashi, et al., Water-Soluble, reciprocity-Law-Failing Photoresist Composed of Poly(acrylamide-co-diacetone acrylamide) and Water-Soluble Bisazide, Photographic Science and Engineering, Vol. 23, No. 3, May/June (1979). Polymerization was achieved in aqueous solutions by the addition of ammonium persulfate followed by sodium sulfite as initiators to generate free radicals and then repeating the successive addition of the initiators a second time an hour and a half later to continue the free radical generation. These free radicals interact with the acrlyamide and diacetone acrylamide monomers, activating them. These activated monomers then interact with each other generating the copolymer (PAD) of acrylamide (AA) with diacetone acrylamide (DAA). This process takes between 18 and 24 hours to reach completion and the viscosity and molecular weight of the polymer are difficult to control.

To use these polymers and copolymers as a resist component in the automated production process, the polymer viscosity must fall within a narrow margin of acceptance values in order to control the photoresist thickness precisely, e.g. ±2 cps. Viscosity is a reflection of the molecular weight, and thus the extent of polymerization and the size of the polymer achieved during polymerization of the monomers. The co-polymer PAD is not commercially available.

The formation of high molecular weight acrylamide polymers obtained by copolymerizing acrylamide with a monovinyl monomer in the presence of a redox type catalyst comprising a persulfate, an aliphatic amine and at least one Lewis acid selected from the group consisting of chlorides and bromides of aluminum, antimony, lithium and zinc is taught in Isaokaet al., U.S. Pat. No. 3,931,122. The monovinyl monomer is preferably acrylic acid but may extend to other monovinyl monomers such as methacrylic acid, acrylonitrile and vinyl pyridine and their salts where applicable. These are considerably different from the diacetone acrylamide monomer utilized by Kohashi, et al., supra in preparing water-soluble, reciprocity-failing poly(acrylamide-co-diacetone acrylamide) photoresists. The objective of isaoka et al. was to prepare a slurry which yielded, over about a period of 8 hours, a powdered polymer product which could be subsequently used as a flocculent in removing solid fine particles from aqueous suspensions, e.g. for water purification and other environmental purposes. The Lewis acid was stated as being an essential component in the redox catalyst. When the Lewis acid was not present, an unstable slurry of a polymer formed which flocculated and could not be recovered as a powder. There is no suggestion in Isaoka et al. that an acrylamide copolymer could be obtained by rapid polymerization which would be suitable for use as a photoresist. Nor is there a suggestion that a suitable redox catalyst could be utilized which did not contain a Lewis acid. A combination of a persulfate salt and an ethanol amine or aminoethanol along with a Lewis acid are shown as the preferred redox catalysts. Other aliphatic amines such as hexamethylene diamine, diethylene triamine, triethylene tetramine, tetraethylene pentamine, polyethyleneimine, tetramethylethylene diamine, tetraethylpropylene diamine and tetramethylhexamethylene diamine are listed as possible amines to be used in combination with the persulfate salt and the Lewis acid but are not specifically exemplified.

SUMMARY OF THE INVENTION

It is an object of the present invention to provide a process for the rapid polymerization of copolymers of acrylamide and diacetone acrylamide.

Another object of this invention is to provide a process for the rapid polymerization of copolymers of acrylamide and diacetone in the presence of free radical initiators and tetramethylamine catalysts.

Still another object of the invention is to provide a process for the rapid polymerization of copolymers of acrylamide and diacetone wherein the molecular weight of the copolymer and its viscosity are controlled by the concentration of the free radical initiator and tetramethylamine catalyst.

These and other objects may be accomplished by a process wherein acrylamide monomers in the presence of diacetone acrylamide monomers, are rapidly copolymerized in an aqueous solution in the presence of both a free radical initiator and a tetramethylamine catalyst. Such copolymers may subsequently be admixed with photosensitizer crosslinking agents and utilized as photoresists in a conventional manner. However, the use which may be made of such copolymers is not limited to preparation of photoresists only, as the invention resides in the rapid polymerization of the monomeric components by means of the use of free radical initiators and tetramethylamine catalysts.

Acrylamide and diacetone acrylamide monomers are very toxic to humans and can result in irreversible neurological damage whereas the resulting acrylamide copolymers are much less toxic to humans. Thus, acceleration of the polymerization process to limit human exposure to the monomers is highly desirable. Additionally, during rapid polymerization, a higher level of control can be exerted in determining the final molecular weight of the polymeric product.

It has now been found that the use of tetramethylamines having the configuration N,N,N',N'-tetramethyl[A]diamine, function as catalysts in the presence of free radical initiators to accelerate the copolymerization of acrylamide and diacetone acrylamide into PAD. In the above formula [A] represents any suitable radical interconnecting the N,N'-diamine nitrogen atoms. Particularly useful are those N,N,N',N' tetramethyldiamines selected from the group consisting of N,N,N',N'-tetramethylethylenediamine (TEMED), N,N,N', N'-tetrakis(2-hydroxypropyl)ethylenediamine (TKHED), N,N,N',N'-tetramethyl-3-(10H-phenothiazin-10-yl)-1,2-propanediamine (Aminopromazine), N,N,N',N'-tetramethyl-pregn-5-ene-3β,20α-diamine (Kurchessine), N,N,N',N'-tetramethyl-1,4-butanediamine (Putricine), 4,4'-tetramethyldiaminodiphenylmethane, N,N,N',N'-tetramethyl-1,4-benzenediamine (tetramethyl-p-phenylenediamine), and N,N,N',N'-tetramethyl-1,4-napthalenediamine. These N,N'tetramethyl[A]diamines are generally known in the art for various uses, some of which are in redox catalyst combinations as noted by Isaoka et al., supra. However, the N,N' tetramethyl functionality as an accelerant, when used in combination with a free radical initiator, for the copolymerization of acrylamide and diacetone acrylamide as claimed herein has not been previously recognized.

There follows a more detailed description showing how tetramethylamines can act as accelerants in the copolymerization of acrylamide and diacetone acrylamide when used in conjunction with a free radical initiator such as those selected from the group consisting of ammonium persulfate, riboflavin and hydrogen peroxide. The tetramethylamines function as shuttles for transporting the free radicals.

Following the parameters disclosed herein, near complete polymerization occurs in a matter of minutes, e.g. 10–120 minutes as opposed to the hours, (e.g. 16–18 hours exemplified by Kohashi, et al., supra and 8 hours as exemplified by Isaoka et al., supra) required in previously described methods. Most polymerizations are complete within about 10 to 60 minutes and some within the range of about 10 to 30 minutes depending upon the particular tetramethylamine catalyst used and ratios of initiators and/or catalysts to monomers.

There is also disclosed herein means for polymerization that results in more precise control of the desired viscosity generated in the aqueous acrylamide copolymer. By controlling the concentration of the free radical initiator and tetramethylamine catalyst the molecular weight, and by extension, the viscosity of the resulting copolymers can be decided.

DESCRIPTION OF THE PREFERRED EMBODIMENTS

Hereunder, the preferred embodiments are described in detail:

In order to illustrate the present invention without any intention of limiting the scope thereof, the following examples are given:

EXAMPLE 1

A copolymer (PAD) of acrylamide (AA) and diacetone acrylamide (DAA) was prepared by ammonium persulfate (APS) free radical polymerization catalyzed by N,N,N',N'-tetramethylethylenediamine (TEMED) in an aqueous solution. A 2.67% w. aqueous solution containing a mixture of acrylamide and diacetone acrylamide monomers at a weight ratio of 1.67:1 was used. Although polydiacetone acrylamide is insoluble in water, copolymers of acrylamide and diacetone acrylamide are soluble in water when the weight ratio of acrylamide to diacetone acrylamide is greater than 0.4:1. The solution of monomers was filtered through a 500 mesh filter. Appropriate amounts of APS and TEMED were added at the same time at ambient temperature. The solution was continuously agitated during the addition of the APS and TEMED. To prevent the trapping of oxygen in the solution, nitrogen gas was bubbled through the solution during the addition of APS and TEMED and during the 5 minutes of mixing that followed. After 5 minutes of mixing, the solution was overlaid with nitrogen and allowed to sit at room temperature until polymerization was complete. Polymerization occurred rapidly, with complete polymerization having been attained within 30 minutes. The temperature of the solution increased during polymerization between about 1° to 15° C. depending upon the quantity of APS and TEMED added. Thus, all measurements were obtained after the solution returned to room temperature.

EXAMPLE 2

A copolymer (PAD) of acrylamide (AA) and diacetone acrylamide (DAA) was prepared by ammonium persulfate (APS) free radical polymerization as in Example 1 but catalyzed by tetramethylamines other than TEMED in an aqueous solution. In this example the concentration of AA and DAA monomers (a 2.67% w. solution with an AA to DAA weight ratio of 1.67:1) end APS free radical initiator were held constant and the amount of tetramethylamine catalyst (Catalysts B-H shown in Table A) varied between about 0.01 and 1% by weight of monomers according to the catalyst employed. For purposes of convenience, the catalysts are identified as follows in Table A:

TABLE A

| Identifier | Catalyst Name |
|---|---|
| Catalyst A | N,N,N',N'-tetramethylethylenediamine (TEMED) |
| Catalyst B | N,N,N',N'-tetrakis(2-hydroxypropyl) ethylenediamine (TKHED) |
| Catalyst C | N,N,N',N'-tetramethyl-3-(10H-phenothiazin-10-yl)-1,2-propanediamine (Aminopromazine) |
| Catalyst D | N,N,N',N'-tetramethylpregn-5-ene-3β,20α-diamine (Kurchessine) |
| Catalyst E | N,N,N',N'-tetramethyl-1,4-butanediamine (Putricine) |
| Catalyst F | 4,4'-tetramethyldiaminodiphenylmethane |
| Catalyst G | N,N,N',N'-tetramethyl-1,4-benzenediamine (tetramethyl-p-phenylenediamine) |
| Catalyst H | N,N,N',N'-tetramethyl-1,4-napthalenediamine |

The times for complete polymerization, as determined by temperature increase, did not exceed 120 minutes and, in most cases, were realized in less than 60 minutes. The following results were (or are) obtained and shown in Table B.

TABLE B

| Catalyst | Weight Ratio of APS to Monomers | Weight Ratio of Catalyst:Monomers | Brookfield Viscosity Copolymer Solution (CPS at 22° C.) |
|---|---|---|---|
| B | 1:13 | 1:160 | 28 |
| C | 1:13 | 1:160 | 30 |
| D | 1:13 | 1:160 | 28 |
| E | 1:13 | 1:160 | 29 |
| F | 1:13 | 1:160 | 30 |
| G | 1:13 | 1:160 | 31 |
| H | 1:13 | 1:160 | 30 |

TEMED (Catalyst A) as used in Example 1 was the most convenient and cost effective of the tetramethylamines (Catalysts A-H) and was thus used for the remainder of the examples.

EXAMPLE 3

In this example the amount of ammonium persulfate (APS) used in the synthesis of PAD copolymer was varied while holding the amount of monomers and the amount of TEMED constant at the same concentration as shown in Example 1, i.e. the concentration of AA and DAA monomers (a 2.67% w. solution with an AA to DAA weight ratio of 1.67:1) and TEMED tetramethylamine catalyst (weight ratio TEMED to monomers of 1:80) were held constant and the amount of APS free radical initiator varied at a APS to monomer weight ratio of between 1:13 and 1:400. This was done in order to alter the molecular weight and by extension the viscosity of the final solution. Except for the 1:200 APS to Monomers ratio, the polymerization was essentially complete within a time period of less than 30 minutes. The results are shown in Table C as follows:

TABLE C

| Weight Ratio of APS to Monomers | Weight Ratio of TEMED to Monomers | Brookfield Viscosity (CPS) Copolymer (PAD) Solution (22° C.) |
|---|---|---|
| 1:13 | 1:80 | 16 |
| 1:27 | 1:80 | 18 |
| 1:54 | 1:80 | 30 |
| 1:108 | 1:80 | 65 |
| 1:200 | 1:80 | 88 |
| 1:400 | 1:80 | 1.5 |

Table C shows that as the concentration of APS is dropped, the viscosity of the solution increases. However, once the ratio of APS to acrylamide/diacetone acrylamide monomers drops below about 1:300 by weight, the ability of the monomers in the solution to polymerize is reduced as the APS content decreases and will eventually be lost. At high concentrations of APS, many monomers are activated resulting in many short, low molecular weight polymers (i.e. low viscosity). However, as the amount of ammonium persulfate decreases, fewer monomers are activated resulting in a few, very long, high molecular weight polymers (i.e. high viscosity).

EXAMPLE 4

In this Example the amount of TEMED used in the synthesis of PAD copolymer was varied while holding the amount of monomer and the amount of APS at the same concentration as shown in Example 1, i.e. the concentration of AA and DAA monomers (a 2.67% w. solution with an AA to DAA weight ratio of 1.67:1) and APS free radical initiator (weight ratio APS:monomers of 1:13) were held constant and the amount of TEMED tetramethylamine catalyst varied at a TEMED to monomer weight ratio of between 1:40 and 1:600. As in the previous example, this was done in order to alter the molecular weight and by extension the viscosity of the final solution. Except for the 1:320 TEMED to Monomers ratio, the polymerization was complete within a period of between about 10 to 30 minutes with the higher TEMED concentrations resulting in a more rapid polymerization. The results are shown in Table D as follows:

TABLE D

| Weight Ratio of APS to Monomers | Weight Ratio of TEMED to Monomers | Brookfield Viscosity (CPS) Copolymer (PAD) Solution (22° C.) |
|---|---|---|
| 1:13 | 1:40 | 7 |
| 1:13 | 1:80 | 16 |
| 1:13 | 1:160 | 27 |
| 1:13 | 1:320 | 29 |
| 1:13 | 1:600 | 1.5 |

The TEMED catalyst functions as a shuttle for free radicals. Thus, in the presence of TEMED, the number of monomers activated is much higher than when APS is used alone. Table D shows that as the concentration of TEMED is dropped, the viscosity of the solution increases. However, once the ratio of TEMED to acrylamide/diacetone acrylamide monomers drops below about 1:400 by weight, the ability of the solution to polymerize is lost. At high concentrations of TEMED, many activated monomers are formed resulting in many short, low molecular weight polymers (i.e. low viscosity). However, as the amount of TEMED decreases (e.g. 1:320 TEMED to monomers ratio), fewer activated monomers are formed resulting in a few, very long, high molecular weight polymers (i.e. high viscosity). As the amount of TEMED is decreased even more (e.g. 1:600 TEMED to monomers ratio), the number of activated monomers is dependent almost solely on APS thus, rapid polymerization did not occur.

While the invention is not limited, except by functionality, to any particular concentration of monomers in solution it has been found that the weight percentage of monomers in an aqueous monomer solution containing acrylamide and diacetone acrylamide at a ratio of 1.67:1 could be increased up to 10% total monomer and still maintain polymerization results similar to those described above when the concentrations of ammonium persulfate and TEMED were varied. However, as the concentration of monomers was increased, the viscosity of the resulting solution increased in an almost exponential manner. For rapid polymerization of monomers the concentration of monomers in an aqueous solution can vary between about 0.1 and 15.0% w. and most preferably between about 0.5 and 7.0%.

When preparing copolymers, the weight ratio of acrylamide and diacetone acrylamide in the aqueous monomer solution can vary between 0.4:1 and 100:1 while still maintaining polymerization results similar to those described above when the concentrations of ammonium persulfate and TEMED were varied. Preferably the ratios will vary between about 1.2:1 and 30:1.

The weight ratios of free radical initiators, i.e. APS, riboflavin and hydrogen peroxide to monomers can vary between about 1:6 to 1:300, with weight ratios of between about 1:10 and 1:200 being preferred and ratios of between about 1:25 and 1:150 being most preferred. APS is the preferred free radical initiator.

The weight ratios of tetramethylamine catalyst to monomers may vary between 1:20 and 1:400, ratios of between about 1:40 and 1:300 being preferred. While all of the mentioned tetramethylamine catalysts may be utilized, TEMED is the preferred catalyst.

The PAD copolymers and PAM polymers, as noted above, may be combined with photosensitizers and utilized in the color picture tube or photoengraving industries as a polymeric component of the light sensitive photoresist.

While the above provides a detailed description of the invention and the best mode of practicing it to the extent that it has been developed, the invention is not to be limited solely to the description and examples. There are modifications which may become apparent to one skilled in the art in view of the description contained herein. Therefore, the invention is to be limited in scope only by the following claims and their functional equivalents.

After having disclosed and described in all details my present invention, what I claim is:

1. A method for the rapid free radical copolymerization of acrylamide monomers and diacetone acrylamide monomers in an aqueous solution which consists of admixing an aqueous acrylamide monomer and diacetone acrylamide monomer solution, wherein the weight ratio of acrylamide monomer to diacetone acrylamide monomer is between about 0.4:1 to 100:1, with effective amounts of each of a free radical initiator and a tetramethylamine catalyst to form a mixture and maintaining said mixture at ambient temperature for between about 10 and 120 minutes until said polymerization is complete.

2. The method of claim 1 wherein said free radical initiator is a member selected from the group consisting of ammonium persulfate, riboflavin and hydrogen peroxide.

3. The method of claim 2 wherein said tetramethylamine catalyst is a member selected from the group consisting of N,N,N',N'-tetramethylethylenediamine (TEMED), N,N,N',N'-tetrakis(2-hydroxypropyl) ethylenediamine (TKHED), N,N,N',N'-tetramethyl-3-( 10H-phenothiazin-10-yl)-1,2-propanediamine (Aminopromazine), N,N,N',N'-tetramethyl-pregn-5-ene-3β,20α-diamine (Kurchessine), N,N,N',N'-tetramethyl-1,4-butanediamine (Putricine), 4,4'-tetramethyldiaminodiphenylmethane, N,N,N',N'-tetramethyl-1,4-benzenediamine (tetramethyl-p-phenylenediamine), and N,N,N',N'-tetramethyl-1,4-napthalenediamine.

4. The method of claim 3 wherein said acrylamide and diacetone acrylamide monomers which are present in said solution at a concentration of between about 0.1 and 15% by weight.

5. The method of claim 4 wherein the weight ratio of free radical initiator to monomers in the solution is between about 1:6 to 1:300.

6. The method of claim 5 wherein the weight ratio of tetramethylamine catalyst to monomers in the solution is between about 1:20 and 1:400.

7. The method of claim 6 wherein said free radical initiator is ammonium persulfate.

8. The method of claim 6 wherein said free radical initiator is riboflavin.

9. The method of claim 6 wherein said free radical initiator is hydrogen peroxide.

10. The method of claim 6 wherein said tetramethylamine catalyst is N,N,N',N'-tetramethylethylenediamine (TEMED).

11. The method of claim 6 wherein said tetramethylamine catalyst is N,N,N',N'-tetrakis(2-hydroxypropyl)ethylenediamine (TKHED).

12. The method of claim 6 wherein said tetramethylamine catalyst is N,N,N',N'-tetramethyl-3-(10H-phenothiazin-10-yl)-1,2-propanediamine (Aminopromazine).

13. The method of claim 6 wherein said tetramethylamine catalyst N,N,N',N'-tetramethylpregn-5-ene-3β,20α-diamine (Kurchessine).

14. The method of claim 6 wherein said tetramethylamine catalyst is N,N,N',N'-tetramethyl-1,4-butanediamine (Putricine).

15. The method of claim 6 wherein said tetramethylamine catalyst is 4,4'-tetramethyldiaminodiphenylmethane.

16. The method of claim 6 wherein said tetramethylamine catalyst is N,N,N',N'-tetramethyl-1,4-benzenediamine (tetramethyl-p-phenylenediamine).

17. The method of claim 6 wherein said tetramethylamine catalyst is N,N,N',N'-tetramethyl-1,4-napthalenediamine.

18. The method of claim 6 wherein nitrogen gas is bubbled through said aqueous solution during said admixing and wherein mixture is maintained at ambient temperature under a blanket of nitrogen gas until said polymerization is complete.

* * * * *